US012482954B2

(12) United States Patent
Zhou et al.

(10) Patent No.: US 12,482,954 B2
(45) Date of Patent: Nov. 25, 2025

(54) HOLOGRAPHIC ANTENNA, BEAM CONTROL METHOD, ELECTRONIC DEVICE, AND COMPUTER READABLE MEDIUM

(71) Applicants: Beijing BOE Technology Development Co., Ltd., Beijing (CN); BOE TECHNOLOGY GROUP CO., LTD., Beijing (CN)

(72) Inventors: Jian Zhou, Beijing (CN); Long Wang, Beijing (CN); Yuehua Liu, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/021,586

(22) PCT Filed: Mar. 31, 2022

(86) PCT No.: PCT/CN2022/084488
§ 371 (c)(1),
(2) Date: Feb. 16, 2023

(87) PCT Pub. No.: WO2023/184376
PCT Pub. Date: Oct. 5, 2023

(65) Prior Publication Data
US 2024/0266752 A1 Aug. 8, 2024

(51) Int. Cl.
*H01Q 21/06* (2006.01)
*H01Q 1/50* (2006.01)
(Continued)

(52) U.S. Cl.
CPC ............. *H01Q 21/064* (2013.01); *H01Q 1/50* (2013.01); *H01Q 3/24* (2013.01); *H01Q 13/106* (2013.01)

(58) Field of Classification Search
CPC .......... H01Q 21/064; H01Q 1/50; H01Q 3/24; H01Q 13/106; H01Q 13/103; H01Q 3/28; H01Q 3/443
See application file for complete search history.

(56) References Cited

U.S. PATENT DOCUMENTS 4,203,117 A * 5/1980 Jacobs .................. H01Q 3/443 343/754
5,068,670 A * 11/1991 Maoz .................. H01Q 13/106 343/862
(Continued)

FOREIGN PATENT DOCUMENTS

CN 101719596 B * 7/2012
CN 108197362 A 6/2018
(Continued)

OTHER PUBLICATIONS

Hwang, "Binary meta-hologram for a reconfigurable holographic metamaterial antenna," Scientific Reports, Oct. 31, 2020, pp. 1-10, <https://www.nature.com/articles/s41598-020-65458-3>.

*Primary Examiner* — Dameon E Levi
*Assistant Examiner* — Jordan E. DeWitt
(74) *Attorney, Agent, or Firm* — HOUTTEMAN LAW LLC

(57) ABSTRACT

A holographic antenna, a beam control method, an electronic device and a computer readable medium are provided. The holographic antenna includes: a dielectric substrate including a first and second surfaces, a radiation layer on the first surface, a reference electrode layer on the second surface and switching units. Slit openings are in the radiation layer and in a one-to-one correspondence with the switching units. The holographic antenna further includes: a calculation part configured to obtain an excitation amplitude of each slit opening through an amplitude sampling function according to position information, a target pointing angle and a simu-
(Continued)

lation frequency of the slit opening; a processing part configured to discretize the excitation amplitude of the slit opening to obtain a discretization result; and a control part configured to control a switching state of a corresponding switching unit according to the discretization result, to control the switching state of the slit opening.

16 Claims, 7 Drawing Sheets

(51) Int. Cl.
*H01Q 3/24* (2006.01)
*H01Q 13/10* (2006.01)

(56) References Cited

U.S. PATENT DOCUMENTS

| | | | | |
|---|---|---|---|---|
| 6,388,624 | B1 * | 5/2002 | Kazumi | H01Q 1/26 118/723 MA |
| 9,450,310 | B2 * | 9/2016 | Bily | H01Q 15/0006 |
| 10,879,617 | B1 * | 12/2020 | Rivera | H01Q 9/06 |
| 11,710,898 | B1 * | 7/2023 | Quarfoth | H03G 3/3036 342/372 |
| 11,978,955 | B2 * | 5/2024 | Stevenson | H01Q 5/314 |
| 2003/0080908 | A1 * | 5/2003 | Mizutani | H01Q 13/10 343/711 |
| 2005/0052329 | A1 * | 3/2005 | Tsukamoto | H01Q 1/243 343/702 |
| 2012/0092217 | A1 * | 4/2012 | Hosoya | H04B 7/086 342/373 |
| 2014/0266946 | A1 * | 9/2014 | Bily | H01Q 3/22 343/771 |
| 2015/0236412 | A1 * | 8/2015 | Bily | H01Q 21/0031 343/731 |
| 2015/0318618 | A1 * | 11/2015 | Chen | H01P 7/082 343/750 |
| 2017/0279193 | A1 * | 9/2017 | Chauloux | H01Q 9/28 |
| 2017/0302004 | A1 * | 10/2017 | Stevenson | H01Q 21/065 |
| 2017/0331186 | A1 * | 11/2017 | Linn | H01Q 21/293 |
| 2018/0294557 | A1 * | 10/2018 | Lu | H01Q 19/067 |
| 2020/0053490 | A1 * | 2/2020 | Shriner | H04R 25/554 |
| 2020/0083605 | A1 * | 3/2020 | Quarfoth | H01Q 13/206 |
| 2020/0235472 | A1 * | 7/2020 | Cercelaru | H01P 1/184 |
| 2021/0328358 | A1 * | 10/2021 | Lee | H01Q 3/34 |
| 2022/0045436 | A1 * | 2/2022 | Ott | H01Q 19/067 |
| 2023/0114625 | A1 * | 4/2023 | Lier | H01Q 21/067 343/700 R |
| 2024/0266742 | A1 * | 8/2024 | Jong | H01Q 1/38 |

FOREIGN PATENT DOCUMENTS

| | | | | | |
|---|---|---|---|---|---|
| CN | 110034416 | A | * | 7/2019 | |
| CN | 110797669 | A | | 2/2020 | |
| CN | 113437492 | A | | 9/2021 | |
| CN | 113964543 | A | | 1/2022 | |
| CN | 119072826 | A | * | 12/2024 | H01Q 3/24 |
| WO | WO-2023184376 | A1 | * | 10/2023 | H01Q 13/206 |

* cited by examiner

HOLOGRAPHIC ANTENNA, BEAM CONTROL METHOD, ELECTRONIC DEVICE, AND COMPUTER READABLE MEDIUM

TECHNICAL FIELD

The present disclosure relates to the field of communication technology, in particular to a holographic antenna, a beam control method, an electronic device and a computer readable medium.

BACKGROUND

An antenna beam control is a reconfiguration of a far-field radiation directional diagram of the antenna. An antenna radiation can be regulated and controlled by optimizing design parameters of the antenna, such as a form, a position and an arrangement of a radiation unit of the antenna, an amplitude and a phase of exciting the unit and the like, so that the radiation far-field radiation directional diagram of a target antenna is obtained. For a communication system, a beam reconfigurable performance of an antenna is very important. In the field of a beam control for an array antenna, a series of beam control methods have been developed. The optimization method mainly includes a traditional beam control and a beam control with a modern intelligent algorithm. The traditional beam control method includes a Dolph-Chebyshev&Taylor synthetic method, a Fourier transform method, a Woodward-Lawson and the like. The beam control with a modern intelligent algorithm includes a genetic algorithm, a simulated annealing algorithm, a particle swarm optimization algorithm and the like. In terms of the optimization for excitation weights, the optimization method may include a method in which an amplitude and a phase of each unit are controlled simultaneously; a method in which the phase of each unit is only controlled; and a method in which the amplitude of each unit is only controlled. Although the calculation process of the traditional beam control method is simple, the application range of the traditional beam control method is relatively narrow, and it is difficult for a complex antenna system that the optimization and design are realized by using the method. Therefore, with its emerge, the intelligent algorithm is gradually applied to the research of the antenna beam control, which solves the difficult problem of a beam control of complex directional diagrams such as a multi-beam control well.

At present, a commonly used beam control scheme is based on a phased array principle, which mainly utilizes a phase shifter to control a phase of each radiation unit. However, with the introduction of the phase shifter, the cost and the power consumption of the device tend to be increased, which severely constrains the future development, the mass production and the market promotion of the technology. If the amplitude of the radiation unit is changed without introducing the phase shifter, the design complexity of the device can be greatly reduced, and a design scheme of a mature leaky-wave antenna can be combined, thereby realizing a beam control method having advantages of easy design, easy machining, easy integration, low power consumption, and the like.

SUMMARY

The present disclosure is directed to solve at least one of the problems of the prior art and provides a holographic antenna, a beam control method, an electronic device and a computer readable medium.

In a first aspect, an embodiment of the present disclosure provides a holographic antenna, including: a dielectric substrate, a radiation layer, a reference electrode layer and a plurality of switching units; the dielectric substrate includes a first surface and a second surface opposite to each other; the radiation layer is on the first surface, and the reference electrode layer is on the second surface; a plurality of slit openings are in the radiation layer; the plurality of switching units are in a one-to-one correspondence with the plurality of slit openings, and each switching unit is configured to control a switching state of the corresponding slit opening; the holographic antenna further includes: a calculation part configured to obtain an excitation amplitude of each slit opening through an amplitude sampling function according to position information, a target pointing angle and a simulation frequency of each slit opening; a processing part is configured to discretize the excitation amplitude of each slit opening to obtain a discretization result; and a control part is configured to control a switching state of each switching unit according to the discretization result, to control the switching state of the corresponding slit opening.

In some embodiments, the radiation layer includes a plurality of microstrip lines; the plurality of slit openings are arranged side by side along an extending direction of each microstrip line, and a length direction of each slit opening is perpendicular to the extending direction of each microstrip line.

In some embodiments, the plurality of microstrip lines include at least two microstrip lines separated from each other.

In some embodiments, each switching unit includes any one of a PIN diode, a variable reactance diode, a liquid crystal switch, a MEMS switch.

In some embodiments, the holographic antenna further includes a feed structure configured to feed the radiation layer.

In some embodiments, the feed structure includes a waveguide feed structure or a power division network feed structure.

In some embodiments, a width of each slit opening is in a range from $\lambda g/10$ to $\lambda g/20$; and a length of each slit opening is in a range from $\lambda g/2$ to $\lambda g/6$.

In some embodiments, the radiation layer includes a metal mesh structure.

In a second aspect, an embodiment of the present disclosure provides a beam control method for a holographic antenna, the holographic antenna includes: a dielectric substrate, a radiation layer and a plurality of switching units; the dielectric substrate includes a first surface and a second surface opposite to each other; the radiation layer is on the first surface, and the reference electrode layer is on the second surface; a plurality of slit openings are in the radiation layer; the plurality of switching units are in a one-to-one correspondence with the plurality of slit openings, and each switching unit is configured to control a switching state of the corresponding slit opening; the method includes: obtaining an excitation amplitude of each slit opening through an amplitude sampling function according to position information, a target pointing angle and a simulation frequency of each slit opening; discretizing the excitation amplitude of each slit opening to obtain a discretization result; and controlling a switching state of each switching unit according to the discretization result, to control the switching state of the corresponding slit opening.

In some embodiments, the beam control method further includes: obtaining an interference wave through an interference between a reference wave and a target wave; and performing a calculation on the interference wave according to a preset algorithm to obtain the amplitude sampling function.

In some embodiments, the discretizing the excitation amplitude of each slit opening to obtain a discretization result; and the controlling a switching state of each switching unit according to the discretization result, to control the switching state of the corresponding slit opening, include: discretizing the excitation amplitude of each slit opening, a discretization threshold is t, and $0<t<1$; obtaining the discretization result M denoted as 1, in response to the excitation amplitude m of each slit opening being not less than t, and obtaining the discretization result M denoted as 0, in response to the excitation amplitude m of each slit opening being less than t; controlling each switching unit to be in an on state in response to the discretization result M being 1, so as to enable the corresponding first slit opening to be in an on state; and controlling each switching unit to be in an off state in response to the discretization result M being 0, so as to enable the corresponding first slit opening to be in an off state.

In a third aspect, an embodiment of the present disclosure provides an electronic device, including: one or more processors; and a memory for storing one or more programs; the one or more programs, when executed by the one or more processors, cause the one or more processors to implement the above beam control method.

In a fourth aspect, the present disclosure provides a computer readable medium, on which a computer program is stored, the computer program, when executed by a processor, implements the steps in the above beam control method.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
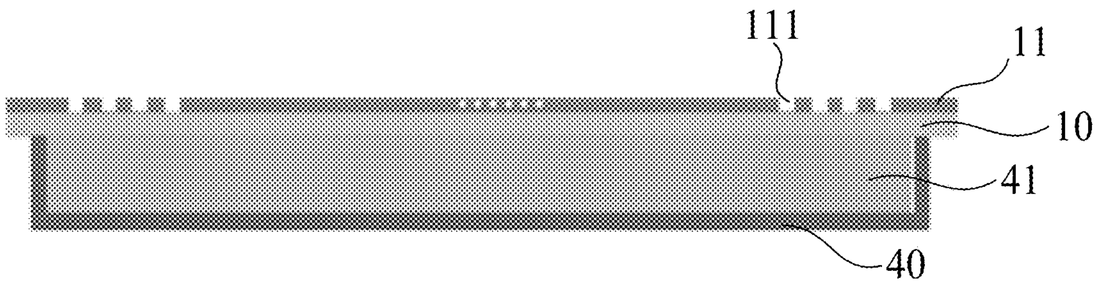
FIG. 1 is a schematic diagram of a structure of an exemplary antenna.

In a first aspect, FIG. 1 is a schematic diagram of a structure of an exemplary antenna. As shown in FIG. 1, the antenna includes a dielectric substrate 10, a radiation layer 11, a feed structure, and a plurality of switching units. The radiation layer 11 includes, but is not limited to, a microstrip line. In this example, as an example, the radiation layer 11 includes the microstrip line. The microstrip line is disposed on the dielectric substrate 10, and is provided with a plurality of slit openings 111 disposed side by side along an extending direction of the microstrip line, and a length direction of each slit opening 111 is perpendicular to the extending direction of the microstrip line. The feed structure adopts a waveguide feed structure 40 on a side of the dielectric substrate 10 away from the microstrip line. That is, the waveguide feed structure 40 is equivalent to a reference electrode layer 12. A waveguide cavity of the waveguide feed structure 40 may be filled with a low-loss polymer material 41 to achieve the effect of a slow wave waveguide. Alternatively, an air medium may also be filled in the waveguide cavity. The plurality of switching units are disposed in a one-to-one correspondence with the plurality of slit openings 111. Each switching unit is configured to control the corresponding slit opening 111 to feed out the radio frequency signals. A switching state of the slit opening 111 may be controlled by a switching state of the corresponding switching unit according to a beam direction.

Figure 2:
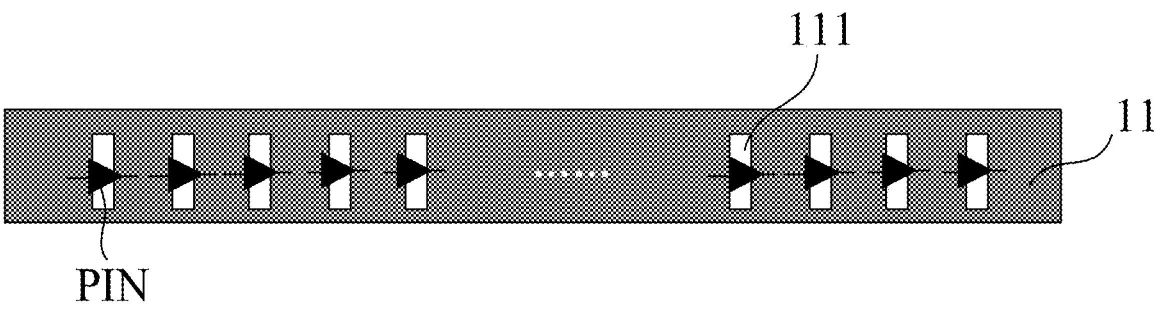
FIG. 2 is a schematic diagram of an exemplary switching unit.

FIG. 2 is a schematic diagram of an exemplary switching unit. As shown in FIG. 2, each switching unit may be a PIN diode (a positive intrinsic negative diode) or a variable reactance diode Varactor. In this case, the PIN diode or the variable reactance diode Varactor may be integrated with the corresponding slit opening 111, thereby realizing a capability of regulating and controlling a diadic amplitude or a continuous amplitude. For example: by taking an example in which each switching unit is the PIN diode, an input of a bias voltage to the PIN diode is controlled, so that a forward bias/reverse bias of the PIN diode is controlled. When the slit opening 111 is required to be in an on state, the bias voltage input to the corresponding PIN diode is greater than a conduction threshold of the PIN diode (or a threshold voltage for causing the PIN diode to enter the on state), and the PIN diode is conducted (or the PIN diode enters the on state; or the PIN diode is turned on); when the slit opening 111 is required to be in an off state, the bias voltage input to the corresponding PIN diode is smaller than the conduction threshold of the PIN diode, and the PIN diode is turned off.

Figure 3:
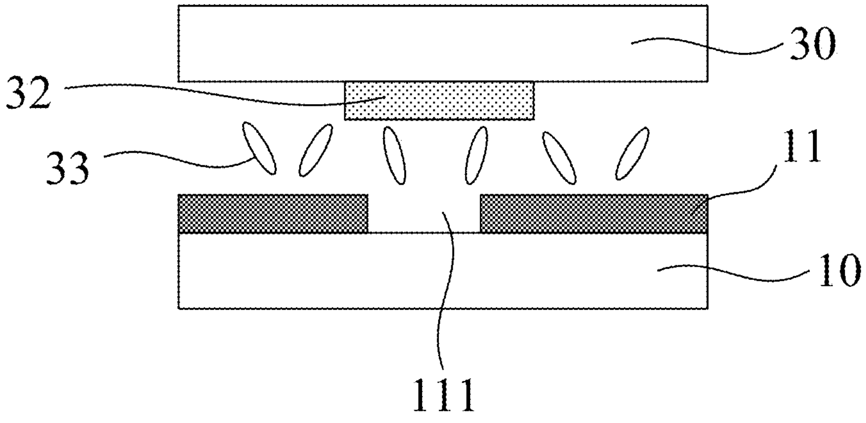
FIG. 3 is a schematic diagram of an exemplary switching unit.

FIG. 3 is a schematic diagram of another exemplary switching unit. As shown in FIG. 3, each switching unit is a liquid crystal switch, that is, each switching unit is provided with an opposite substrate 30 opposite to the dielectric substrate 10, a control electrode 31 on the opposite substrate 30, and a liquid crystal layer 32 between a layer where the control electrode 31 on the opposite substrate 30 is located and a layer where the microstrip line is located. By changing a voltage applied to the control electrode 31, a rotation angle of liquid crystal molecules of the liquid crystal layer 32 is changed, thereby realizing a continuous regulation and control for an amplitude of the radio frequency signal radiated from each slit opening 111.

Figure 4:
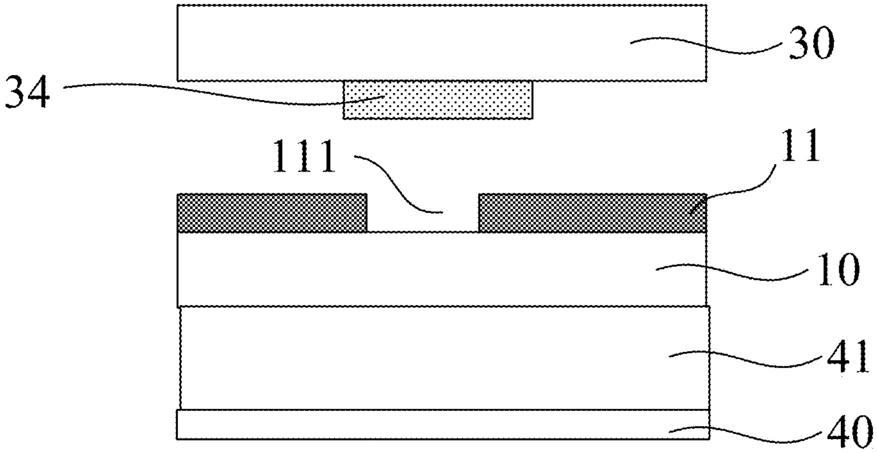
FIG. 4 is a schematic diagram of yet an exemplary switching unit.

FIG. 4 is a schematic diagram of yet another exemplary switching unit. As shown in FIG. 4, each switching unit is a micro electro mechanical system (MEMS) switch. For example: each switching unit is provided with an opposite substrate 30 opposite to the dielectric substrate 10, and a plurality of patch electrodes 34 on the opposite substrate 30 and in a one-to-one correspondence with the plurality of slit openings 111, the opposite substrate 30 is a flexible substrate. By applying a voltage to each patch electrode 34, a distance between the patch electrode 34 and the corresponding slit opening 111 is adjusted under the action of an electric field force, thereby realizing a continuous regulation and control for an amplitude of the radiated radio frequency signal.

Figure 5:
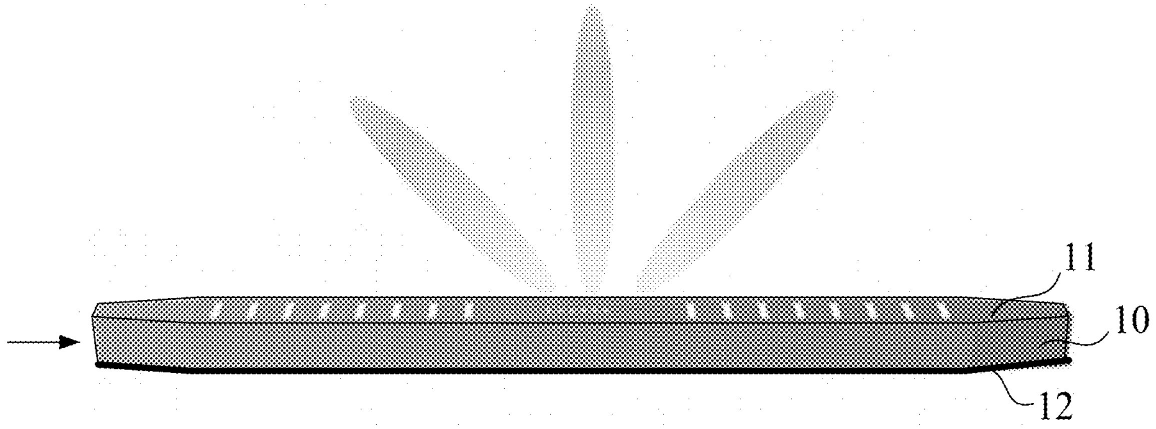
FIG. 5 is a schematic diagram of a structure of an exemplary holographic antenna.
Figure 6:
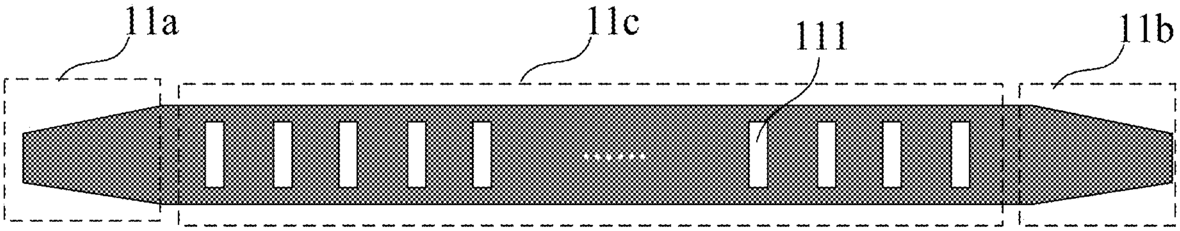
FIG. 6 is a top view of a microstrip line of the holographic antenna of FIG. 5.

FIG. 5 is a schematic diagram of a structure of an exemplary holographic antenna. FIG. 6 is a top view of a microstrip line of the holographic antenna of FIG. 5. As shown in FIGS. 5 and 6, the antenna includes a dielectric substrate 10, a radiation layer 11, a reference electrode layer 12, and a plurality of switching units. The radiation layer 11 and the reference electrode layer 12 are respectively disposed on two opposite sides of the dielectric substrate 10. The radiation layer 11 includes, but is not limited to, a microstrip line. In this example, as an example, the radiation layer 11 includes the microstrip line. The microstrip line has an excitation port 11*a* and a load port 11*b*, and a main body portion 11*c* connected between the excitation port 11*a* and the load port 11*b*; the main body portion 11*c* is provided with a plurality of slit openings 111 arranged side by side in an extending direction of the main body portion 11*c*. In a direction in which the excitation port 11*a* points to the load port 11*b*, a width of the excitation port 11*a* monotonically increases; in a direction in which the load port 11*b* points to the excitation port 11*a*, a width of the load port 11*b* monotonically increases. The plurality of switching units are in a one-to-one correspondence with the plurality of slit openings 111. Each switching unit is configured to control the corresponding slit opening 111 to feed out the radio frequency signals. The structure of each switching unit may adopt any one of the structures in FIGS. 2 to 4, and thus, the detailed description thereof is not repeated. A switching state of the slit opening 111 may be controlled by a switching state of the corresponding switching unit according to a beam direction.

Further, for the antenna, the SubMiniature Version A (SMA) may be used to feed the excitation port 11*a* of the microstrip line.

In some examples, with continued reference to FIG. 5, the excitation port 11*a* of the holographic antenna may be an SMA feed port, which is a tapered port to assist in feeding electrical signals; and the other port of the holographic antenna is the load port 11*b* provided with a matching load having a resistance of 50Ω. In order to realize a full sampling, a size of each slit opening 111 is smaller than a half wavelength λg/2 of the medium. In an embodiment of the present disclosure, the size of each slit opening 111 is set to λg/3, each slit opening 111 has a length between λg/2 and λg/6; and a width between λg/10 and λg/20. Usually, a deviation in a range from 10% to 20% can be allowed to be presented in the optimized size, and the deviation in the range has a less influence on the accuracy of the beam pointing, so that the process compatibility can be improved.

Figure 7:
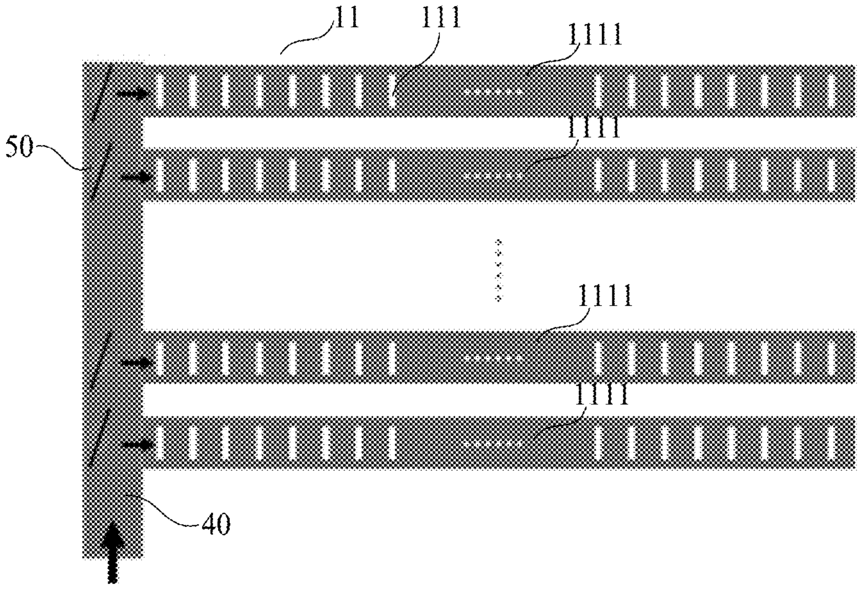
FIG. 7 is a schematic diagram illustrating a feed of a holographic antenna according to an embodiment of the present disclosure.
Figure 8:
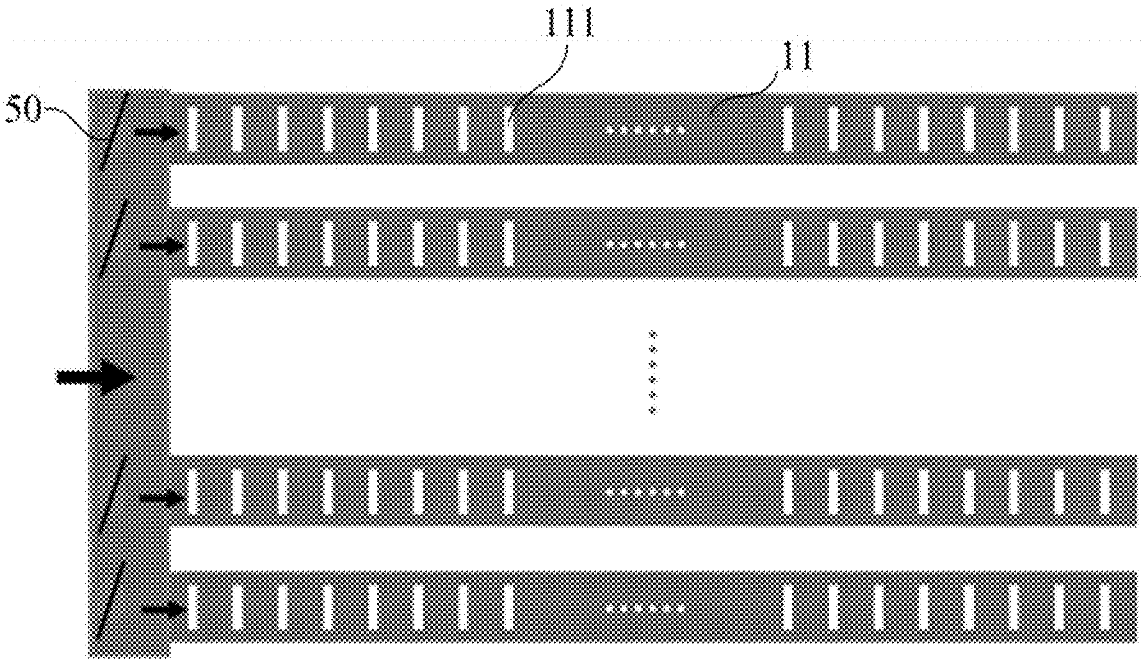
FIG. 8 is another schematic diagram illustrating a feed of a holographic antenna according to an embodiment of the present disclosure.
Figure 9:
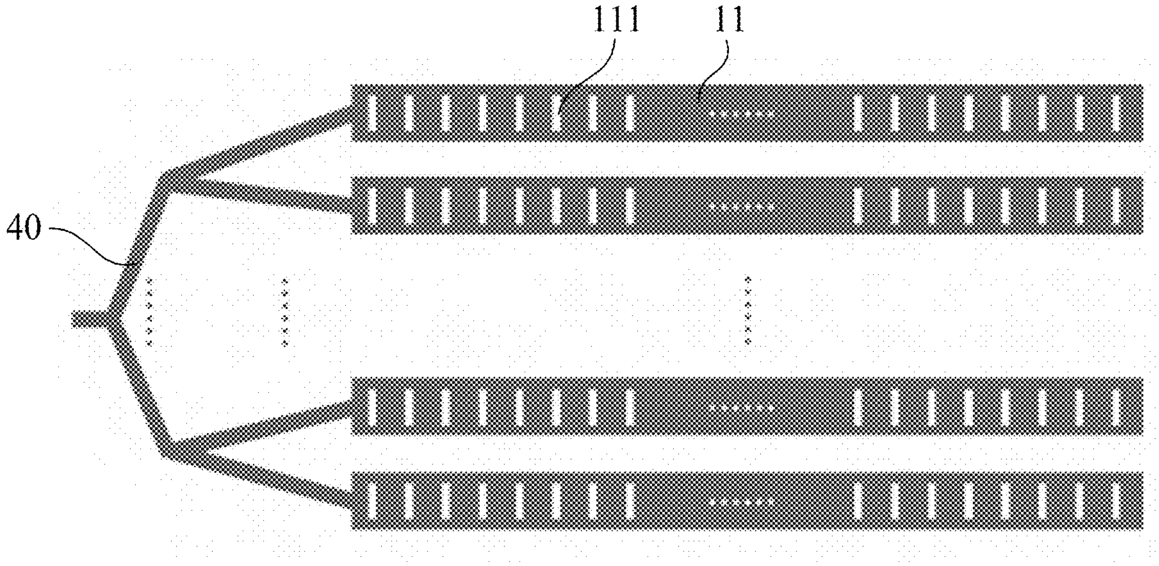
FIG. 9 is yet another schematic diagram illustrating a feed of a holographic antenna according to an embodiment of the present disclosure.

For the situation that the requirement for the radiation gain needs to be improved when a one-dimensional holographic antenna is used in satellite communication, a plurality of one-dimensional antennas need to be arranged side by side. That is, the holographic antenna includes a plurality of microstrip lines 1111 arranged side by side. As shown in FIG. 7, each microstrip line 1111 may be provided as a single-port waveguide feed structure 40. Alternatively, a waveguide feed structure 40 for feeding at its center may be used as shown in FIG. 8. Alternatively, a power division feed structure may be used as shown in FIG. 9. Referring to FIGS. 7 and 8, when the single-port waveguide feed structure 40 and the feed structure 40 for feeding at its center are adopted, a phase shifter 50 may be connected to the excitation ports 11*a* of the plurality of microstrip lines 1111, that is, the radio frequency signal fed through the single-port waveguide feed structure 40 and the feed structure 40 for feeding at its center is phase-shifted by the phase shifter 50 and then is fed into the plurality of microstrip lines 1111. Because distances between the excitation ports 11*a* of the microstrip lines 1111 at different positions and the feed end of the single-port waveguide feed or waveguide center are different, additional transmission phases introduced by the different port positions can be eliminated by providing the phase shifter 50 for phase-shifting.

Figure 10:
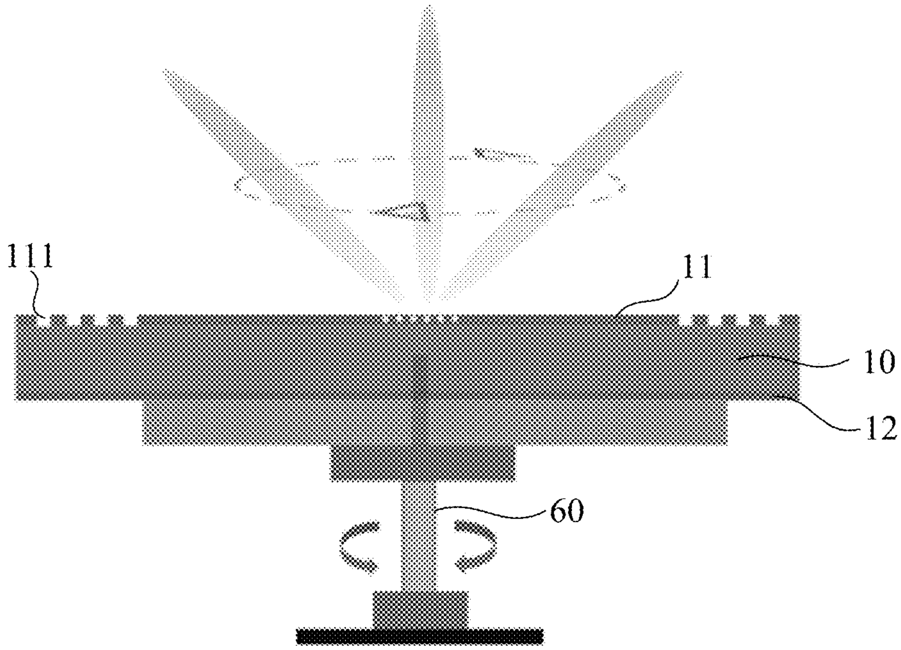
FIG. 10 is a schematic diagram of a structure of a further exemplary holographic antenna.

FIG. 10 is a schematic diagram of a structure of a further exemplary holographic antenna. As shown in FIG. 10, no matter which of the above structures is adopted by the holographic antenna, a rotating component 60 may be disposed in the holographic antenna, and may be rotatably connected to the dielectric substrate 10 to control the dielectric substrate 10 to rotate 360° in the horizontal direction. In this case, an amplitude of the radio frequency signal radiated by each slit opening 111 may be controlled to be adjusted by controlling the switching state of the corresponding switching unit, so that continuous scanning of a pitch angle in two directions having azimuth angles of 0° and 180° can be realized. In order to realize omnidirectional beam pointing in the whole space, the scanning of the whole 360° in the horizontal direction needs to be controlled by the rotating component 60, so that the scanning capability of the reconfigurable beam in the whole space can be realized.

Figure 11:
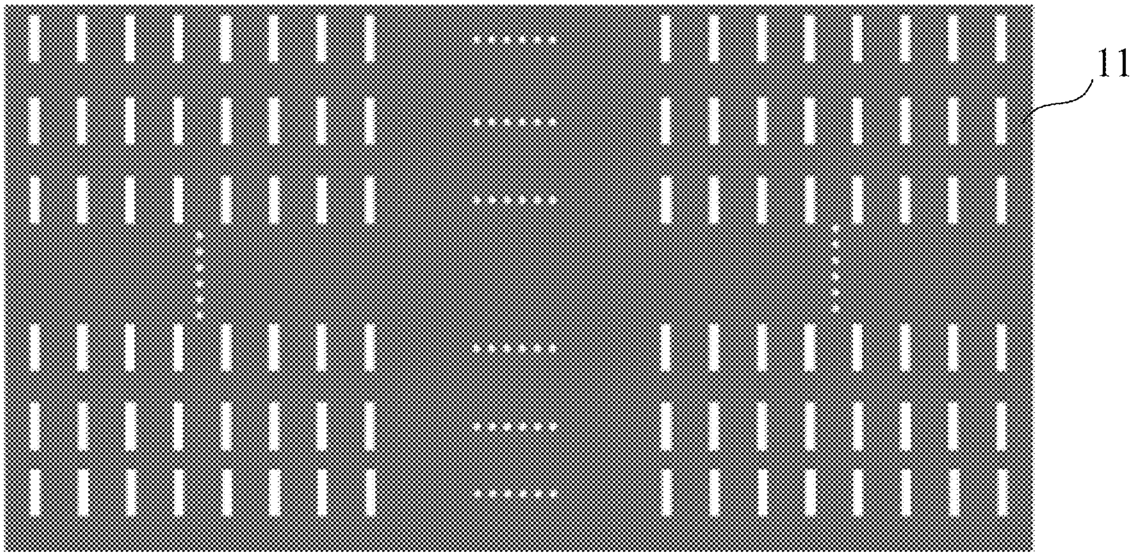
FIG. 11 is a schematic diagram of a radiation layer of a two-dimensional holographic antenna.
Figure 12:
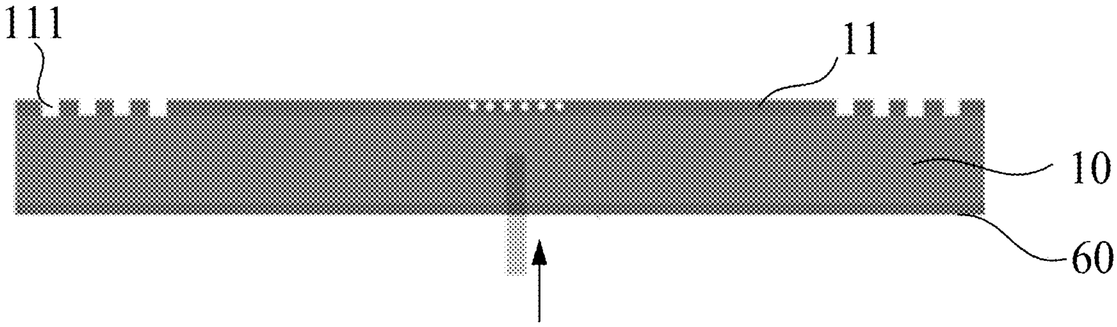
FIG. 12 is a schematic diagram of a structure of a two-dimensional holographic antenna.

FIG. 11 is a schematic diagram of a radiation layer 11 of a two-dimensional holographic antenna. FIG. 12 is a schematic diagram of a structure of a two-dimensional holographic antenna. As shown in FIGS. 11 and 12, slit openings

111 are formed in the radiation layer 11 and arranged in an array. When the radiation layer 11 is applied to the holographic antenna, the holographic antenna is a two-dimensional dynamic holographic antenna, which can realize the omnidirectional beam scanning. The polarization of a beam may be changed during omnidirectional scanning due to asymmetry of the slit openings. The omnidirectional beam scanning of the same polarization can be realized by using a design scheme of a vertically crossing and rectangular slit opening or a circular slit opening 111 (aperture) or the like.

No matter which of the above structures is adopted by the holographic antenna, the radiation layer 11 may be a metal mesh structure. When the antenna includes the reference electrode layer 12, the reference electrode layer 12 may also be a metal mesh structure. The metal mesh structure may be formed on a flexible substrate and then attached to the dielectric substrate 10 by an adhesive layer. A material of the flexible substrate includes, but is not limited to, polyethylene terephthalate (PET) or polyimide (PI), copolymers of cycloolefin (COP) plastic, or the like. A material of the adhesive layer includes, but is not limited to, optically clear adhesive (OCA).

No matter which of the above structures is adopted by the holographic antenna, a material of the dielectric substrate includes, but is not limited to, PVB, PET and low-loss dielectric material including polymer.

The holographic antenna has a wide application scene, and has the advantages of beam reconfiguration, multi-beam generation, multi-frequency beam generation, high-gain beam focusing and the like, so that the holographic antenna has important application in aspects of satellite communication, mobile communication, imaging, wireless charging, multi-user MIMO (multiple input multiple output) and the like.

Figure 13:
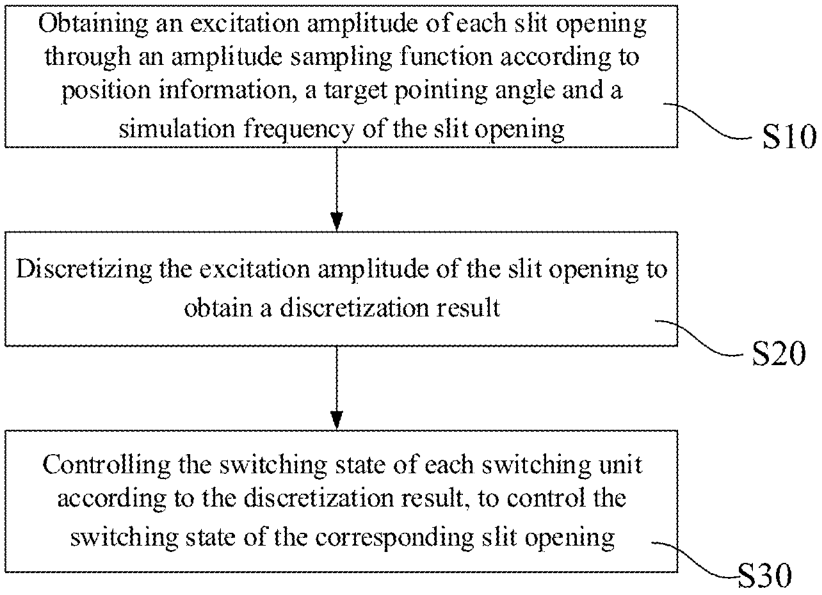
FIG. 13 is a flowchart of a beam control method according to an embodiment of the present disclosure.

In a second aspect, FIG. 13 is a flowchart of a beam control method according to an embodiment of the present disclosure. As shown in FIG. 13, an embodiment of the present disclosure provides a beam control method for a holographic antenna, the holographic antenna may employ the antenna in any one of the above embodiments. The method includes:

S10, obtaining an excitation amplitude of each slit opening 111 through an amplitude sampling function according to position information, a target pointing angle and a simulation frequency of each slit opening 111.

In step S10, the position information of the slit opening 111 on each microstrip line of the holographic antenna may be stored in advance; the simulation frequency may be 26 GHz or any frequency point in a range from 24 GHz to 28 GHz; the target pointing angle may be 0°, ±40°, ±60°, or the like, or other angles. Based on the holographic principle and according to the amplitude sampling function, the excitation amplitude of each slit opening 111 is obtained.

In some examples, before step S10, the method further includes a step of obtaining the amplitude sampling function, which may specifically include:

S01, obtaining an interference wave through an interference between a reference wave and a target wave.

The interference wave may be obtained by multiplying the target wave by a conjugate of the reference wave in step S01.

It should be noted that the holographic principle is as follows: obtaining an interference pattern through the interference between the reference wave and the target wave. The target wave is: $\psi_{obj}(\vec{r};\theta_0,\phi_0)=\exp(-ik_f(\theta_0,\phi_0)\cdot\vec{r})$ The reference wave is: $\psi_{ref}(\vec{r})\approx\exp(-ik_s\cdot\vec{r})$ Where $k_f$ is a target wave vector; $k_s$ is a reference wave vector; the interference pattern information (the interference wave) is represented as follows:

$$T \propto |\psi_{obj} + \psi_{ref}|^2$$

$$T\psi_{ref} \propto |\psi_{obj}|^2\ \psi_{ref} + \psi_{obj}^*\psi_{ref}^2 + \psi_{obj}\,|\psi_{ref}|^2 + |\psi_{ref}|^2\,\psi_{ref}$$

Where $\psi_{obj}|\psi_{ref}|^2$ is the important interference pattern information of the target wave. It can be seen from the above formulas that when the reference wave interferes with the interference pattern, the interference wave having a specific beam angle (a horizontal direction angle $\theta_0$; a beam pointing angle $\varphi_0$) can be obtained.

S02, calculating the interference wave according to a preset algorithm to obtain the amplitude sampling function.

Taking a one-dimensional antenna as an example, step S02 may specifically include expanding an e-exponential function of the interference wave by an euler equation to obtain a real part, i.e., a cosine function. In order to ensure that the amplitude sampling value is always positive, amplitude factors such as $X_i$ and $M_i$ are added, where the amplitude sampling function may be as follows:

$$\alpha_{m,i}(\omega) = X_i + M_i\ \cos\ (\beta x_i + kx_i\ \sin\ \phi_0)$$

where $X_i$ and $M_i$ are amplitude constants, respectively; $X_i \geq M_i$, β is a propagation constant of the reference wave; k is a target propagation constant, a target pointing angle is set to be $\phi_0$, and $x_i$ is a position of a slit opening.

S20, discretizing the excitation amplitude of each slit opening 111 to obtain a discretization result.

In some examples, step S20 may include discretizing the excitation amplitude of each slit opening 111, where a discretization threshold is t, 0<t<1; when the excitation amplitude m of each slit opening 111 is not less than t, the discretization result M is obtained and denoted as 1; and when the excitation amplitude m of each slit opening 111 is less than t, the discretization result M is obtained and denoted as 0.

For example: t=0.5, the number of slit openings 111 is 64, and the excitation amplitude m of each slit opening 111 is 0.79 and the excitation amplitude m of each slit opening 111 is 0.35, which are obtained in step S10, and the discretization result M of the excitation amplitude m of each slit opening 111 is denoted as 1 and the discretization result M of the excitation amplitude m of each slit opening 111 is denoted as 0. Similarly, the discretization results M of the excitation amplitudes m of the 64 slit openings 111 can be obtained.

It should be noted that a magnitude of the discretization threshold t needs to be adjusted, and a simulation diagram of a millimeter wave holographic antenna is obtained by simulating the millimeter wave holographic antenna obtained according to different discretization thresholds t through an electromagnetic software; and the desired discretization threshold t is obtained by comparing the simulation diagram of the millimeter wave holographic antenna with a simulation diagram of an amplitude weighting theory of the holographic antenna. In this way, when the simulation diagram of the millimeter wave holographic antenna with the simulation diagram of the amplitude weighting theory of the holographic antenna are closest to each other, the discretization threshold t corresponding to the simulation diagram of the millimeter wave holographic antenna is used as the desired discretization threshold t.

S30, controlling the switching state of each switching unit according to the discretization result, to control the switching state of the corresponding slit opening 111.

Specifically, when the excitation amplitude m of each slit opening 111 is discretized in step S20 and the discretization result M is denoted as 0 or 1, and when the discretization result M is 1 in step S30, the switching unit is controlled to be in the on state, so that the corresponding slit opening 111 is in the on state; when the discretization result M is 0, the switching unit is controlled to be in the off state, so that the corresponding slit opening 111 is in the off state.

Figure 14:
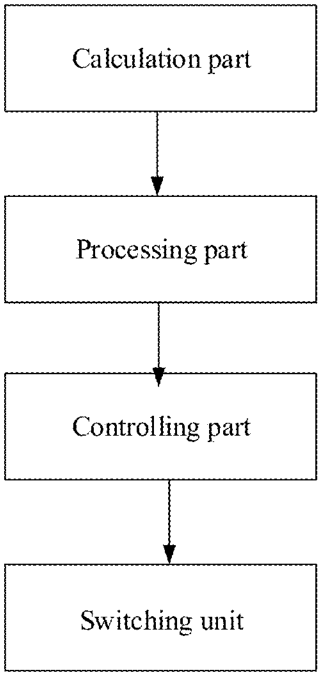
FIG. 14 is a schematic diagram of a portion of a structure of a holographic antenna according to an embodiment of the present disclosure.

FIG. 14 is a schematic diagram of a portion of a structure of a holographic antenna according to an embodiment of the present disclosure. As shown in FIG. 14, the embodiment of the present disclosure further provides a holographic antenna, which may include the structure in the holographic antenna, and further includes: a calculation part, a processing part and a control part. The calculation part is configured to obtain an excitation amplitude of each slit opening 111 through an amplitude sampling function according to position information, a target pointing angle and a simulation frequency of each slit opening 111; the processing part is configured to discretize the excitation amplitude of each slit opening 111 to obtain a discretization result; and the control part is configured to control the switching state of each switching unit according to the discretization result, to control the switching state of the corresponding slit opening 111.

It should be noted that the calculation part in the embodiment of the present disclosure may be configured to perform step S10 in the beam control method; the processing part may be configured to perform step S20 in the beam control method; and the control part may be configured to perform step S30 in the beam control method.

In some examples, the calculation part, the processing part, and the control part in embodiments of the present disclosure may be integrated together.

Figure 15:
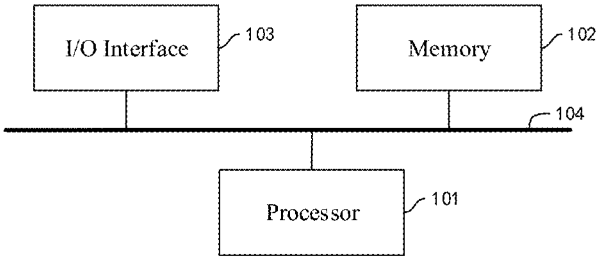
FIG. 15 is a schematic diagram of a structure of an electronic device according to an embodiment of the present disclosure.

In a third aspect, an embodiment of the present disclosure provides an electronic device. FIG. 15 is a schematic diagram of a structure of an electronic device according to an embodiment of the present disclosure. As shown in FIG. 15, the electronic device includes: one or more processors 101, a memory 102, one or more I/O interfaces 103. The memory 102 stores one or more programs that, when executed by the one or more processors, cause the one or more processors to implement the beam control method in any one of the above embodiments; the one or more I/O interfaces 103 are connected between the one or more processors and the memory and are configured to enable information interaction between the one or more processors and the memory.

Each processor 101 is a device with data processing capability, which includes, but is not limited to, a central processing unit (CPU), etc.; the memory 102 is a device with data storage capability, which includes, but is not limited to, random access memory (RAM, more specifically SDRAM, DDR, etc.), read only memory (ROM), electrically erasable programmable read only memory (EEPROM), flash memory (FLASH); the one or more I/O interfaces (read/write interfaces) 103 are connected between the one or more processors 101 and the memory 102 and are configured to enable information interaction between the one or more processors 101 and the memory 102, and include, but are not limited to, a data bus (Bus) etc.

In some embodiments, the one or more processors 101, the memory 102, and the one or more I/O interfaces 103 are connected to each other via the bus 104, which in turn are connected to other components of a computing device.

In some embodiments, the one or more processors 101 include a field programmable gate array (FPGA).

According to an embodiment of the present disclosure, a computer readable medium is further provided. The computer readable medium stored a computer program thereon, the program, when executed by a processor, implements the steps in the beam control method according to any one of the above embodiments.

In particular, the processes described above with reference to the flow diagrams may be implemented as computer software programs, according to the embodiments of the present disclosure. For example, an embodiment of the present disclosure includes a computer program product including a computer program embodied on a machine readable medium, the computer program includes a program code for performing the method as shown in the flow diagrams. In such an embodiment, the computer program may be downloaded from a network via a communication portion and then installed, and/or installed from a removable medium. The above functions defined in the system of the present disclosure are performed when the computer program is executed by a central processing unit (CPU).

It should be noted that the computer readable medium shown in the present disclosure may be a computer readable signal medium or a computer readable storage medium or any combination thereof. The computer readable storage medium may be, for example, but not limited to, an electronic, magnetic, optical, electromagnetic, infrared, or semiconductor system, apparatus, or device, or any combination thereof. More specific examples of the computer readable storage medium may include, but be not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, the computer readable storage medium may be any tangible medium that may contain or store a program for use by or in connection with an instruction execution system, an apparatus, or a device. In the present disclosure, the computer readable signal medium may include a propagated data signal with computer readable program code embodied therein, for example, in baseband or as part of a carrier wave. Such the propagated data signal may take any of a variety of forms, including, but not limited to, an electro-magnetic signal, an optical signal, or any suitable combination thereof. The computer readable signal medium may be any computer readable medium except the computer readable storage medium. The computer readable signal medium may communicate, propagate, or transport a program for use by or in connection with the instruction execution system, the apparatus, or the device. The program code embodied on the computer readable medium may be transmitted using any appropriate medium, including, but not limited to: wireless, wire, fiber optic cable, RF, etc., or any suitable combination thereof.

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, a part, a program segment, or a portion of a code, which include one or more executable instructions for implementing specified logical function(s). It should also be noted that in some alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowcharts, and a combination of blocks in the block diagrams and/or flowcharts may be implemented by special purpose hardware-based systems that perform the specified functions or operations, or a combination of special purpose hardware and computer instructions.

Circuits or sub-circuits described in the embodiments of the present disclosure may be implemented by software or hardware. The described circuits or sub-circuits may also be provided in a processor, which may be described as: a processor, including: a receiving circuit and a processing circuit, the processing circuit includes a write sub-circuit and a read sub-circuit. Names of such circuits or sub-circuits do not constitute a limitation of the circuits or sub-circuits themselves in some cases. For example, the receiving circuit may also be described as "receiving a video signal".

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A holographic antenna, comprising: a dielectric substrate, a radiation layer, a reference electrode layer and a plurality of switching units;

wherein the dielectric substrate comprises a first surface and a second surface opposite to each other; the radiation layer is on the first surface, and the reference electrode layer is on the second surface; a plurality of slit openings are in the radiation layer; the plurality of switching units are in a one-to-one correspondence with the plurality of slit openings, and each of the plurality of switching units is configured to control a switching state of a corresponding slit opening of the plurality of slit openings;

wherein the radiation layer comprises a plurality of microstrip lines, each of the plurality of microstrip lines extends along a first direction, the plurality of microstrip lines are arranged side by side along a second direction perpendicular to the first direction, and every two adjacent microstrip lines are spaced apart from each other, and each of the plurality of microstrip lines is provided with multiple slit openings, which are arranged side by side along the first direction, and a length direction of each slit opening is perpendicular to the extending direction of the microstrip line;

wherein each of the plurality of microstrip lines has an excitation port and a load port, and a main body portion connected between the excitation port and the load port;

the excitation port extends along the first direction; and the multiple slit openings are arranged side by side in the main body portion along the first direction; and wherein in a direction in which the excitation port points towards the load port, a width of the excitation port monotonically increases; and in a direction in which the load port points towards the excitation port, a width of the load port monotonically increases.

2. The holographic antenna of claim 1, wherein each of the plurality of switching units comprises any one of a PIN diode, a variable reactance diode, a liquid crystal switch, a MEMS switch.

3. The holographic antenna of claim 1, further comprising a feed structure configured to feed the radiation layer.

4. The holographic antenna of claim 3, wherein the feed structure comprises a waveguide feed structure or a power division network feed structure.

5. The holographic antenna of claim 1, wherein a width of the slit opening is in a range from λg/10 to λg/20; and a length of the slit opening is in a range from λg/2 to λg/6, where λg is an electromagnetic wave wavelength in the dielectric substrate.

6. The holographic antenna of claim 1, wherein the radiation layer comprises a metal mesh structure.

7. A beam control method for a holographic antenna, wherein the holographic antenna comprises: a dielectric substrate, a radiation layer, a reference electrode layer and a plurality of switching units;

wherein the dielectric substrate comprises a first surface and a second surface opposite to each other; the radiation layer is on the first surface, and the reference electrode layer is on the second surface; a plurality of slit openings are in the radiation layer; the plurality of switching units are in a one-to-one correspondence with the plurality of slit openings, and each of the plurality of switching units is configured to control a switching state of a corresponding slit opening of the plurality of slit openings; wherein the radiation layer comprises a plurality of microstrip lines, each of the plurality of microstrip lines extends along a first direction, the plurality of microstrip lines are arranged side by side along a second direction perpendicular to the first direction, and every two adjacent microstrip lines are spaced apart from each other, and each of the plurality of microstrip lines is provided with multiple slit openings, which are arranged side by side along the first direction, and a length direction of each slit opening is perpendicular to the extending direction of the microstrip line;

wherein each of the plurality of microstrip lines has an excitation port and a load port, and a main body portion connected between the excitation port and the load port;

the excitation port extends along the first direction; and the multiple slit openings are arranged side by side in the main body portion along the first direction; and wherein in a direction in which the excitation port points towards the load port, a width of the excitation port monotonically increases; and in a direction in which the load port points towards the excitation port, a width of the load port monotonically increases, wherein the beam control method comprises:

obtaining an excitation amplitude of each slit opening through an amplitude sampling function according to position information, a target pointing angle and a simulation frequency of the slit opening;

discretizing the excitation amplitude of the slit opening to obtain a discretization result; and controlling a switching state of the switching unit according to the discretization result, to control the switching state of the corresponding slit opening.

8. The beam control method of claim 7, further comprising:

obtaining an interference wave through an interference between a reference wave and a target wave; and performing a calculation on the interference wave according to a preset algorithm to obtain the amplitude sampling function.

9. The beam control method of claim 7, wherein the discretizing the excitation amplitude of the slit opening to obtain a discretization result and the controlling a switching state of the switching unit according to the discretization result, to control the switching state of the corresponding slit opening comprise:

discretizing the excitation amplitude of the slit opening, wherein a discretization threshold is t, and 0<t<1;

obtaining the discretization result M denoted as 1, in response to the excitation amplitude m of the slit opening being not less than t, and obtaining the discretization result M denoted as 0, in response to the excitation amplitude m of the slit opening being less than t;

controlling the switching unit to be in an on state in response to the discretization result M being 1, so as to enable the corresponding slit opening to be in an on state; and controlling the switching unit to be in an off state in response to the discretization result M being 0, so as to enable the corresponding slit opening to be in an off state.

10. An electronic device, comprising:

one or more processors; and a memory for storing one or more programs;

wherein the one or more programs, when executed by the one or more processors, cause the one or more processors to implement the beam control method of claim 7.

11. A non-transitory computer readable storage medium, on which a computer program is stored, wherein the computer program, when executed by a processor, implements the beam control method of claim 7.

12. The holographic antenna of claim 2, wherein a width of the slit opening is in a range from λg/10 to λg/20; and a length of the slit opening is in a range from λg/2 to λg/6, where λg is an electromagnetic wave wavelength in the dielectric substrate.

13. The holographic antenna of claim 2, wherein the radiation layer comprises a metal mesh structure.

14. The holographic antenna of claim 3, wherein a width of the slit opening is in a range from λg/10 to λg/20; and a length of the slit opening is in a range from λg/2 to λg/6, where λg is an electromagnetic wave wavelength in the dielectric substrate.

15. The holographic antenna of claim 1, wherein each of the plurality of microstrip lines comprises a waveguide feed structure which extends along the second direction, and is connected to the excitation port of each of the plurality of microstrip lines to feed an electric signal to the microstrip line.

16. The holographic antenna of claim 15, wherein the holographic antenna further comprises a plurality of phase shifters in one-to-one correspondence with the plurality of microstrip lines, and each of the plurality of phase shifters is provided between the waveguide feed structure and the excitation port of one corresponding microstrip line of the plurality of microstrip lines such that the electric signal is phase-shifted by the phase shifter and then is fed into the corresponding microstrip line.

* * * * *